United States Patent
Giebel et al.

[19]

[11] Patent Number: 5,923,802
[45] Date of Patent: Jul. 13, 1999

[54] FLEXIBLE CONNECTOR ASSEMBLY HAVING SLACK STORAGE

[75] Inventors: Markus A. Giebel; James P. Luther; Thomas Theuerkorn, all of Hickory, N.C.

[73] Assignee: Siecor Corporation, Hickory, N.C.

[21] Appl. No.: 08/870,666

[22] Filed: Jun. 6, 1997

[51] Int. Cl.$^6$ .................................................. G02B 6/36
[52] U.S. Cl. ................................ 385/76; 385/25; 385/59; 385/60; 385/134; 385/78; 385/84
[58] Field of Search ................................. 385/78, 25, 26, 385/138, 76, 59, 60, 66, 67, 68, 71, 72, 84, 139, 134

[56] References Cited

U.S. PATENT DOCUMENTS

| | | | |
|---|---|---|---|
| 4,793,684 | 12/1988 | Oppenlander | 350/96.23 |
| 5,521,998 | 5/1996 | Walles et al. | 385/86 |
| 5,661,843 | 8/1997 | Rickenbach et al. | 385/147 |

*Primary Examiner*—Hung N. Ngo

[57] ABSTRACT

The at least partially flexible connector assembly includes a slack storage tube connected to the first end of a fiber optic cable for loosely storing excess lengths of the optical fibers. The slack storage tube is typically at least partially flexible. By including a flexible slack storage tube, the connector assembly can be readily flexed, such as during installations of the fiber optic cable in which the end portion of the fiber optic cable must be bent relatively sharply. However, the slack storage tube does generally include crush resistance means for supporting the slack storage tube as the connector assembly is flexed such that the longitudinal bore defined by the slack storage tube remains open. The crush resistance means can include a wire helically wound about the slack storage tube. Alternatively, the slack storage tube can be a corrugated tube. The connector assembly also includes a number of ferrules mounted on the end portions of respective optical fibers as well as a ferrule holder for holding the ferrules in respective predetermined positions. In addition, the connector assembly can include a plug connected at a first end to the slack storage tube and having a second end that is adapted to receive and engage the ferrule holder. By disposing the ferrule holder within the second end of the plug, the plug effectively secures the ferrule holder and, in turn, the ferrules to the slack storage tube so as to form the connector assembly.

22 Claims, 4 Drawing Sheets

of these conventional fiber optic connectors, the at least partially flexible connector assembly of the present invention was developed for mounting upon the first end of a fiber optic cable. The connector assembly includes at least one ferrule mounted upon the end portion of a respective optical fiber of the fiber optic cable. The connector assembly also includes a slack storage tube extending between a rear end and an opposed head end and defining a lengthwise extending bore. The rear end of the slack storage tube is connected to the first end of the fiber optic cable. In addition, the ferrule is operably attached to the head end of the slack storage tube such that the optical fiber extends through the bore defined by the slack storage tube. Since the length of the slack

FLEXIBLE CONNECTOR ASSEMBLY HAVING SLACK STORAGE

FIELD OF THE INVENTION

The present invention relates generally to fiber optic connector assemblies and, more particularly, to fiber optic connector assemblies having slack storage capabilities.

BACKGROUND OF THE INVENTION

A variety of fiber optic connector assemblies have been developed which can be mounted upon an end portion of a fiber optic cable to facilitate connection or coupling of the optical fibers. As a result, optical fibers can be effectively routed and can be easily connected, such as to other optical fibers, to a patch panel or other closure in a telephone central office or in an office building or to various remote terminals or pedestals, as required.

In addition to the standard fiber optic connectors that have been developed for mounting upon the end portion of a single optical fiber, such as the SC, FC, ST and D4 connectors, a number of fiber optic connectors have been developed which receive and maintain two or more optical fibers in respective predetermined positions during interconnection. These multi-fiber connectors are becoming increasingly important as the demand for optical communications increases. For example, it is desirable in many fiber-to-the-desk applications to route a pair of optical fibers to each desk in order to concurrently transmit and receive optical signals.

Exemplary multi-fiber connectors include the ESCON™ connector and the FCS™ connector. These connectors include a pair of conventional ferrules, each of which receives and maintains a single optical fiber in a predetermined position during interconnection. The ESCON™ and FCS™ connectors also include a housing or yoke which surrounds and supports the ferrules in a side-by-side relationship. As a result, these fiber optic connectors provide for the simultaneous connection of two or more optical fibers. However, ESCON™ and FCS™ connectors are generally relatively large since each connector must include at least two conventional ferrules positioned in a side-by-side relationship.

ESCON™ and FCS™ connectors do not allow for the storage of excess or slack lengths of the optical fibers within the connector housing. In this regard, the length of each optical fiber that extends beyond the protective jacket of the fiber optic cable, i.e., the leg length of each optical fiber, must be precisely determined prior to mounting the multi-fiber connector upon the fiber optic connector since the optical fibers have only the minimum necessary length to extend through the housing of the multi-fiber connector. As a result, if one of the ferrules of the multi-fiber connector is defective or is improperly mounted upon the respective optical fiber, the multi-fiber connector must be removed from the end portion of the fiber optic cable. The fiber optic cable must then be reworked, such as by stripping additional portions of the protective jacket from the fiber optic cable and by severing the end portions of the optical fibers upon which the ferrules were originally mounted since the optical fibers would otherwise be too long. Only then can the multi-fiber connector be remounted upon the end portion of the reworked fiber optic cable by again mounting ferrules upon the end portions of the respective optical fibers. Therefore, if a single ferrule is defective or is improperly mounted upon a respective optical fiber, all of the ferrules of the multi-fiber connector, including the undamaged ferrules, are generally scraped since the multi-fiber connector must be removed from the fiber optic cable and remounted thereupon once the end portion of the fiber optic cable has been reworked. Thus, fiber optic connectors which do not provide storage for excess or slack lengths of the optical fibers require a significant amount of reworking and create substantial scrap if one of the ferrules is defective or is improperly mounted upon a respective optical fiber.

As known to those skilled in the art, ferrules must oftentimes be individually processed, i.e., polished, once the ferrules have been mounted upon the end portions of respective optical fibers. It is difficult, however, to separately process the ferrules mounted upon end portions of the respective optical fibers of a multi-fiber connector that does not provide for the storage of excess or slack lengths of the optical fibers since the ferrules cannot generally be separated by a sufficient distance in order to be individually processed. In this regard, the maximum separation of the ferrules is limited by the leg lengths of the optical fibers extending beyond the protective jacket of the fiber optic cable. As described above, however, the leg lengths of the optical fibers are relatively short since the optical fibers typically only extend beyond the protective jacket of the fiber optic cable by the minimum length necessary to extend through the housing of the multi-fiber connector. Thus, it may be relatively difficult to effectively polish the respective end faces of the individual ferrules of a multi-fiber connector since the ferrules can only be physically separated by a relatively small distance.

Fiber optic connectors have been designed which provide for the storage of excess or slack optical fiber. However, these fiber optic connectors also suffer from a number of deficiencies. Notably, conventional fiber optic connectors that provide for the storage of excess or slack optical fiber typically include a housing in which the slack lengths of the optical fibers are looped one or more times. Since the optical fibers cannot be bent beyond a minimum bend radius, such as 3 to 4 centimeters for most optical fibers, these housings generally have relatively large cross-sectional dimensions. For example, housings of conventional fiber optic connectors that provide for the storage of excess or slack optical fibers may have a diameter of 10 centimeters or more. As a result, these fiber optic connectors cannot be utilized in applications which require the fiber optic connectors to fit within relatively small spaces. In addition, conventional fiber optic connectors that provide for the storage of excess or slack optical fiber typically include a rigid housing. Therefore, these fiber optic connectors may be relatively difficult to handle in applications which demand a relatively flexible cable, such as applications in which the cable must be installed along a cable path that has numerous twists and turns.

SUMMARY OF THE INVENTION

In order to address at least some of the shortcomings storage tube is preferably less than the predetermined distance by which the optical fiber extends beyond the protective jacket of the fiber optic cable, the optical fiber has slack that is maintained within the slack storage tube.

Since the connector assembly of the present invention stores excess or slack optical fiber within the slack storage tube, a damaged or improperly mounted ferrule can be replaced by merely mounting another ferrule upon the same optical fiber without having to rework the fiber optic cable and remount the connector assembly upon the reworked fiber optic cable. Accordingly, the amount of scrap generated during the replacement of a damaged or improperly mounted ferrule is significantly reduced by the connector assembly of the present invention since all other ferrules can remain mounted upon the end portion of the respective optical fibers and need not be scrapped. Since relatively long lengths of excess or slack optical fiber can be stored within the slack storage tube of the connector assembly, the individual ferrules of a multi-fiber connector assembly can also be widely separated during the assembly process and can therefore be individually processed, i.e., individually polished. Thus, the assembly of the connector assembly of the present invention upon the first end of the fiber optic cable is also simplified.

The slack storage tube is preferably at least partially flexible. By including a flexible slack storage tube, the connector assembly can be readily flexed, such as during installations of the fiber optic cable in which the end portion of the fiber optic cable must be bent relatively sharply. The flexibility of the connector assembly of the present invention therefore significantly improves the handling characteristics of the end portion of a fiber optic cable.

However, the slack storage tube advantageously includes crush resistance means for supporting the slack storage tube as the connector assembly is flexed such that the longitudinal bore defined by the slack storage tube remains open. The crush resistance means can include a wire helically wound about the slack storage tube. Alternatively, the slack storage tube can be a corrugated tube.

Preferably, the optical fiber is not looped within the slack storage tube. Instead, the optical fiber is held in a generally helical arrangement within the slack storage tube. The slack storage tube can therefore have a relatively small diameter, such as two inches or less. As a result, the connector assembly of this embodiment is particularly advantageous for installation applications that demand relatively small connector assemblies, such as installation applications that require preconnectorized fiber optic cables to be pulled through a duct system.

The lengthwise extending strength member of the fiber optic cable preferably extends beyond the protective jacket and into the bore defined by the slack storage tube. In addition, the slack storage tube can define at least one epoxy fill port. Thus, by introducing epoxy through the epoxy fill port and into the bore of the slack storage tube, the lengthwise extending strength member of the fiber optic cable can be secured within the slack storage tube.

The connector assembly can also include a mesh sleeve in order to increase the strength of the resulting connector assembly. The mesh sleeve surrounds the slack storage tube and extends between first and second ends. The first end of the mesh sleeve is connected to the first end of the fiber optic cable, while the second end of the mesh sleeve is operably attached to the at least one ferrule.

The connector assembly can also include a ferrule holder for engaging the at least one ferrule and for maintaining the at least one ferrule in a predetermined position. The ferrule holder is operably attached to the head end of the slack storage tube. In this regard, the connector assembly can also include a plug connected at a first end to the slack storage tube. The plug of this embodiment also includes a second end adapted to receive and engage the ferrule holder, thereby securing the ferrule holder and, in turn, the ferrules within the connector assembly of the present invention.

The connector assembly of the present invention can therefore be mounted upon the first end of a fiber optic cable in such a manner that excess or slack optical fiber is stored within the slack storage tube. As a result, the ferrules of the connector assembly can be individually processed, such as by being individually polished during the assembly process. In addition, a defective or improperly mounted ferrule can be readily replaced without requiring the fiber optic cable to be reworked and the connector assembly to be remounted upon the reworked fiber optic cable. Additionally, the connector assembly does not require the excess or slack optical fiber to loop within the slack storage tube. As a result, the size of the slack storage tube can be significantly reduced so as to permit installation of a preconnectorized fiber optic cable through a relatively small opening, such as a duct. Moreover, the slack storage tube is at least partially flexible such that the handling characteristics of the end portion of the fiber optic cable assembly are improved.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
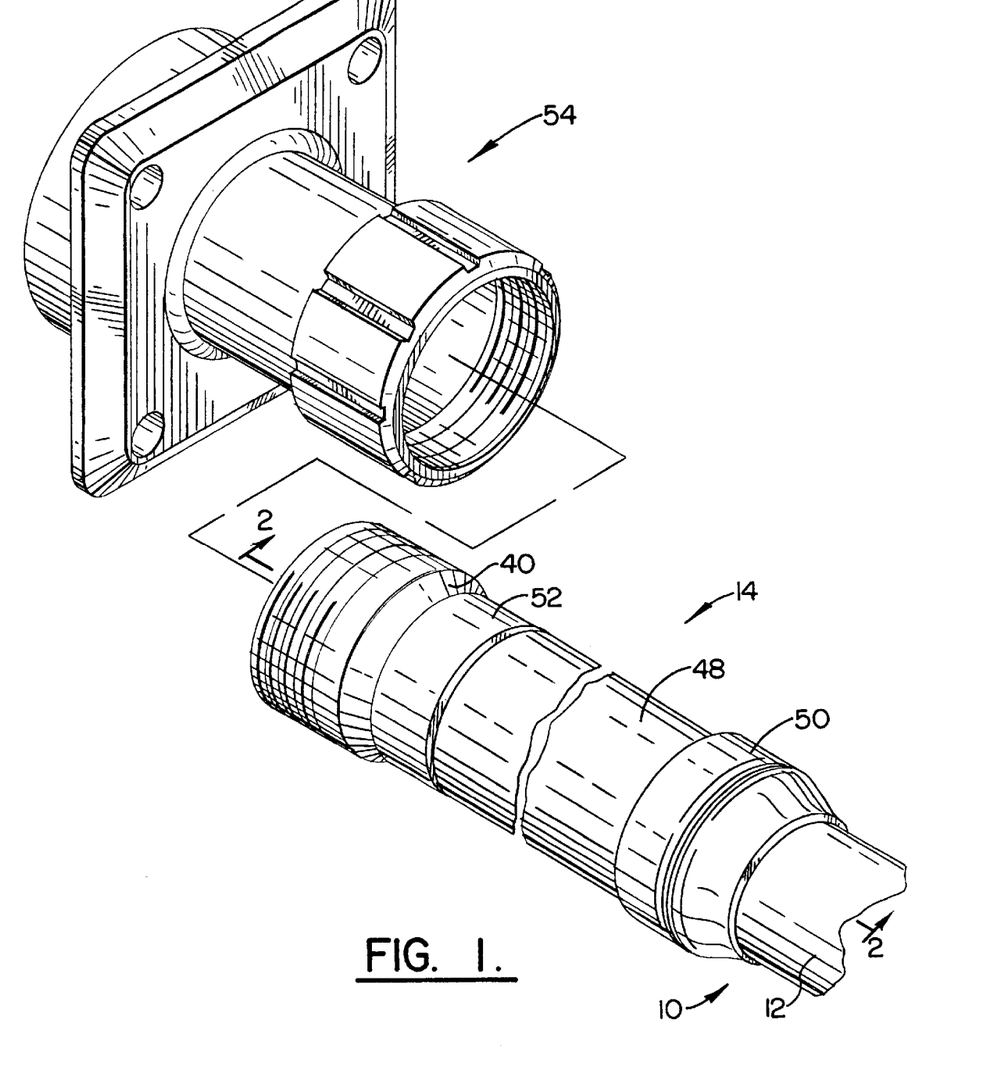
FIG. 1 is a perspective view of a fiber optic cable assembly of one embodiment of the present invention which illustrates the end portion of a fiber optic cable and an at least partially flexible connector assembly mounted to the first end of the fiber optic cable in preparation for connection to a corresponding receptacle.
Figures 2, 3:
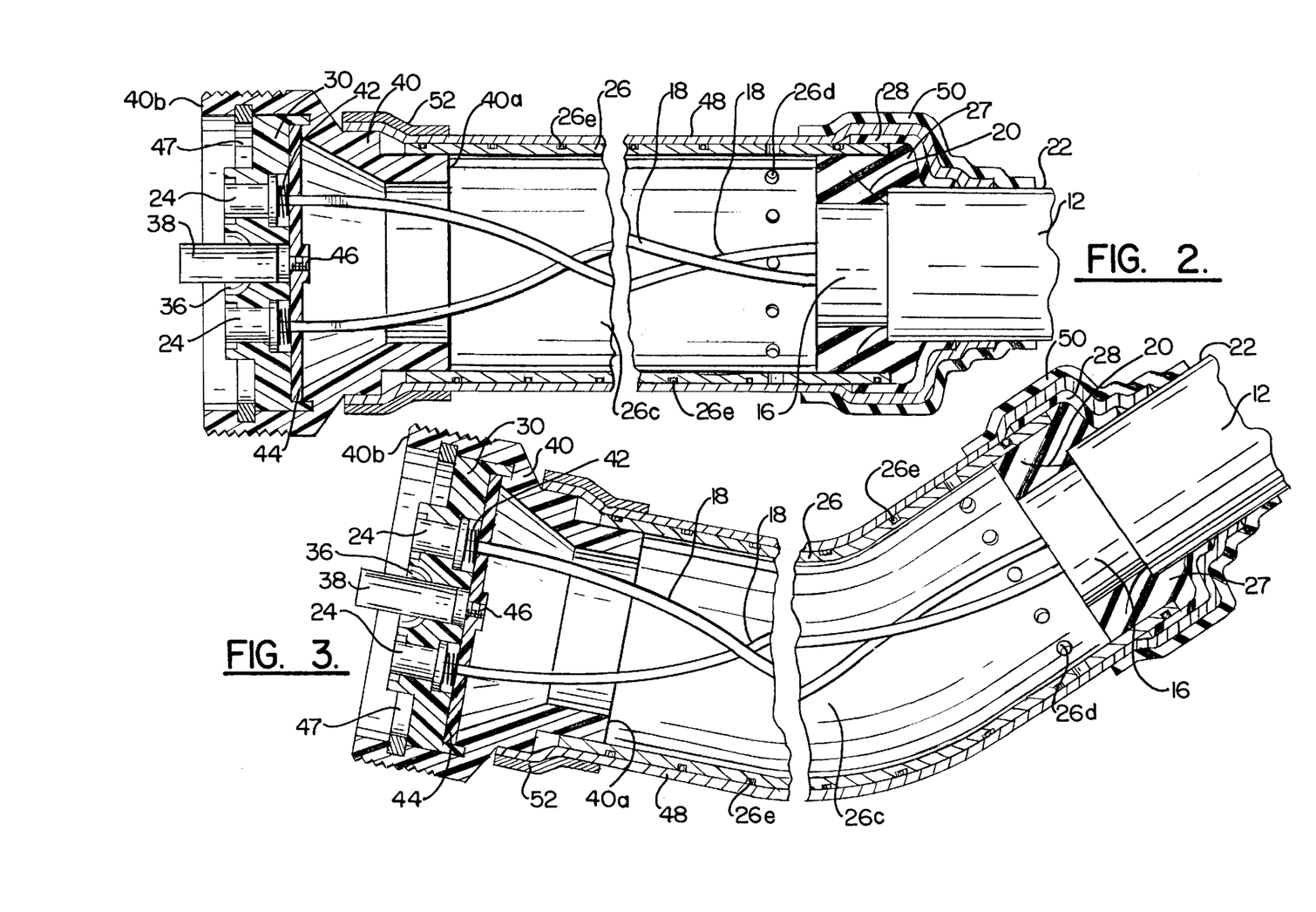
FIG. 2 is a cross-sectional view of the connector assembly taken along line 2—2 in FIG. 1.
FIG. 3 is a cross-sectional view of the connector assembly of FIGS. 1 and 2 which illustrates the connector assembly in a flexed position.

As shown in FIGS. 1 and 2, the fiber optic cable assembly 10 of the present invention includes a fiber optic cable 12 and a connector assembly 14 mounted upon a first end of the fiber optic cable. As shown, the fiber optic cable can include a single central buffer tube 16 having one or more optical fibers or, alternatively, one or more optical fiber ribbons 18 that each include a predetermined number of optical fibers. However, the fiber optic cable assembly can include other types of fiber optic cables, such as a fiber optic cable including a number of buffer tubes stranded about a central support member, without departing from the spirit and scope of the present invention. Regardless of the number and configuration of the buffer tubes, the fiber optic cable also generally includes a strength member 20 surrounding or extending alongside the buffer tubes and a protective jacket 22 surrounding the buffer tubes and the strength member. As shown in FIG. 2, for example, the strength member can include a lengthwise extending wire mesh that surrounds the buffer tube. Alternatively, the strength member can include one or more metallic rods that extend lengthwise along the buffer tube.

The connector assembly 14 includes one or more ferrules 24. The ferrules can include single fiber ferrules that are mounted upon the end portions of respective optical fibers. Alternatively, the ferrules can include multi-fiber ferrules, such as the MT ferrules shown in FIGS. 2–4, mounted on the end portions of respective ones of the optical fibers. For example, the connector assembly can include a plurality of multi-fiber ferrules mounted upon the end portions of respective optical fiber ribbons 18.

The connector assembly 14 also includes a slack storage tube 26. The slack storage tube extends between a rear end 26a and an opposed head end 26b and defines a lengthwise extending bore 26c. As best illustrated in FIGS. 2 and 3, the rear end of the slack storage tube is mounted or connected to the first end of the fiber optic cable 12. In this regard, a shrink tube 28 or crimp band is generally placed over the first end of the fiber optic cable and the rear end of the slack storage tube so as to bridge from the fiber optic cable to the slack storage tube. By heating the shrink tube, the shrink tube contracts about the first end of the fiber optic cable and the rear end of the slack storage tube, thereby connecting to fiber optic cable and the slack storage tube.

The strength member 20 of the fiber optic cable 12 also preferably extends beyond the protective jacket 22 and into the lengthwise extending bore 26c of the slack storage tube 26 as shown in FIGS. 2 and 3. As a result, the slack storage tube can be further secured to the first end of the fiber optic cable by filling the rear end 26a of the slack storage tube with any suitable epoxy, such as known to those skilled in the art. Once the epoxy has cured or hardened about the strength member of the fiber optic cable, the strength member is securely held within the slack storage tube.

In this regard, the slack storage tube 26 can define one or more epoxy fill ports 26d through which the epoxy can be introduced into the lengthwise extending bore 26c defined by the slack storage tube. Typically, the slack storage tube defines a number of epoxy fill ports spaced evenly about the circumference of the slack storage tube. The epoxy fill ports are preferably spaced from the rear end 26a of the slack storage tube by a distance which approximates the thickness of the epoxy plug 27 formed within the rear end of the slack storage tube since epoxy generally fills the slack storage tube from the rear end to the epoxy fill ports. In this regard, the epoxy fill ports defined by the slack storage tube of one advantageous embodiment are spaced approximately 1 inch from the rear end of the slack storage tube.

Figure 4:
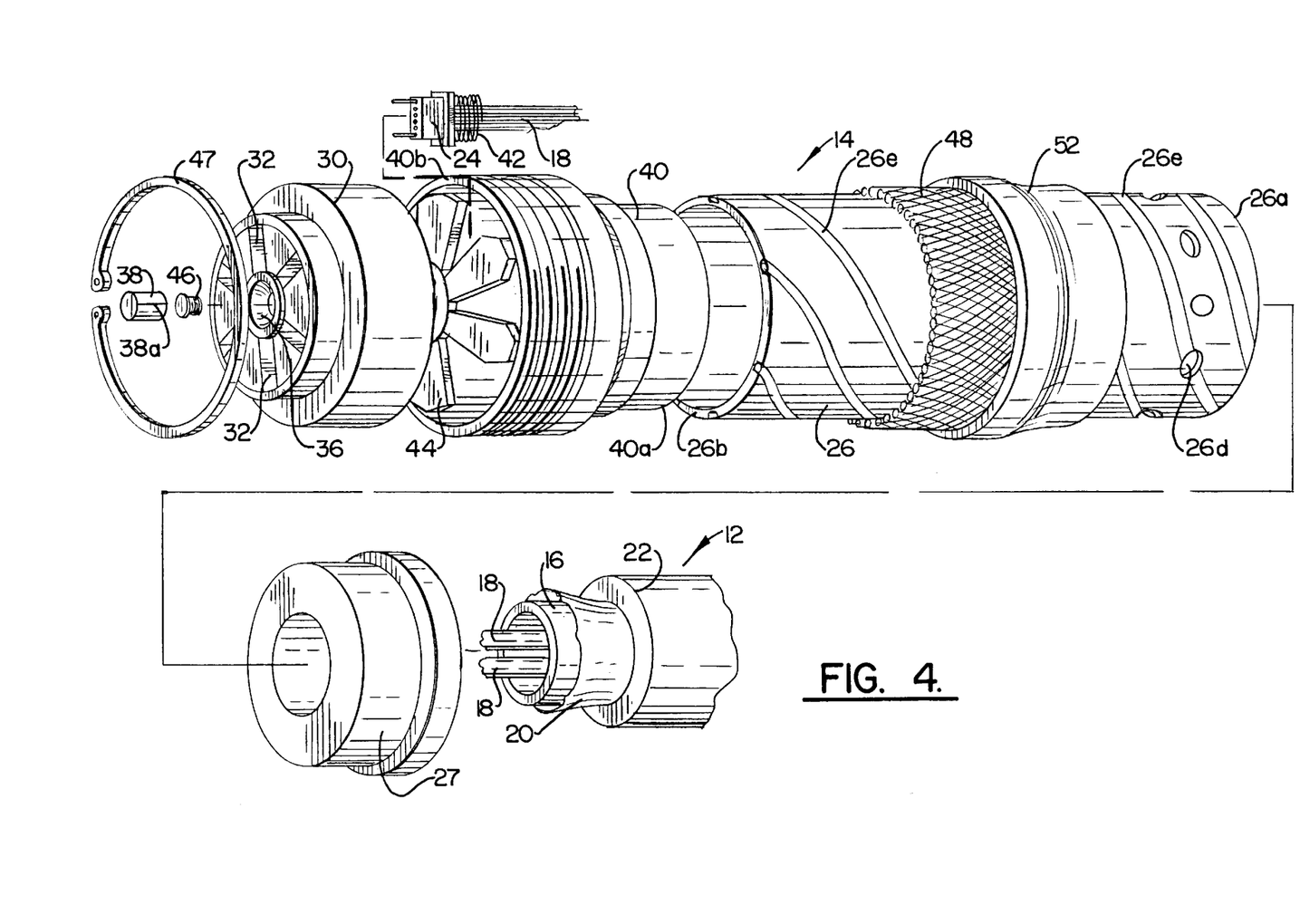
FIG. 4 is an exploded perspective view of the connector assembly of FIGS. 1 and 2 in which the first and second shrink tubes have been removed and in which the mesh sleeve and the crimp band have been slid rearward on the slack storage tube in a direction away from the plug for purposes of illustration.

As is also illustrated in FIGS. 2 and 3, the ferrules 24 are operably attached to the head end 26b of the slack storage tube 26 such that the optical fibers extend from the first end of the fiber optic cable 12, through the bore 26c defined by the slack storage tube, and to the respective ferrule that is operably attached to the head end of the slack storage tube. As shown in FIGS. 2–4, the connector assembly 14 preferably includes a ferrule holder 30 defining a number of openings 32 for receiving respective ones of the ferrules. The openings in the ferrule holder of FIGS. 2–4 are sized and shaped to receive the ferrules and to maintain the ferrules in respective predetermined positions relative to the ferrule holder and, in turn, relative to the entire connector assembly.

The connector assembly 14 of the present invention can include a variety of ferrule holders 30 without departing from the spirit and scope of the present invention. As illustrated in FIGS. 2–4, however, the ferrule holder of one advantageous embodiment is adapted to receive and hold a number of multi-fiber ferrules 24, such as MT ferrules, in respective predetermined positions. For example, the ferrule holder of this embodiment can hold six or twelve MT ferrules disposed in a radial arrangement and separated by equal angular increments.

Figures 5, 6:
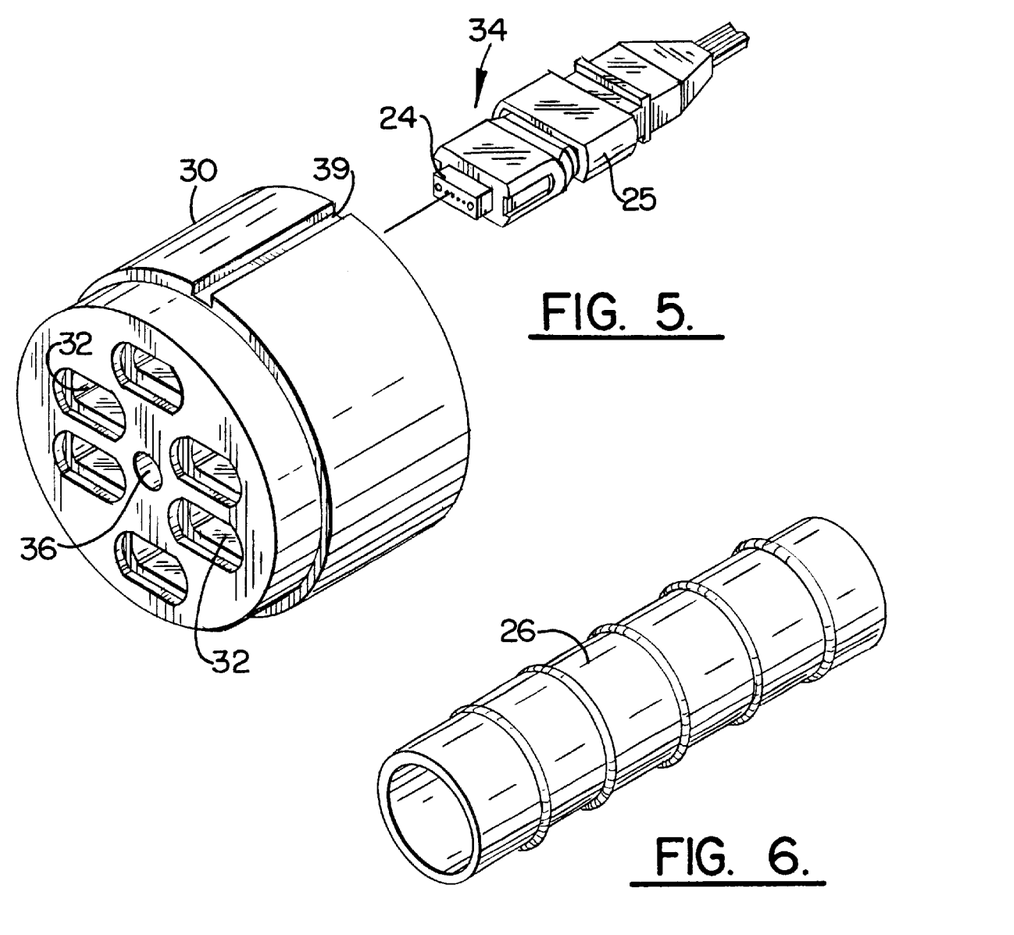
FIG. 5 is an exploded perspective view of a ferrule holder of another advantageous embodiment of the connector assembly which is adapted to receive a plurality of MTP connectors, each of which includes a respective MT multi-fiber ferrule.
FIG. 6 is a perspective view of a corrugated slack storage tube of a connector assembly of another advantageous embodiment of the present invention.

Alternatively, the ferrule holder 30 can be designed to receive fully connectorized optical fibers. In this embodiment, the ferrule holder can define openings that have been sized and shaped to receive ferrules 24 that have already been mounted within a connector housing 25. As shown in FIG. 5, for example, the ferrule holder is adapted to receive six MTP connectors 34, each of which includes a respective MT ferrule mounted upon the end portion of an optical fiber ribbon.

Regardless of the embodiment, the ferrule holder 30 of one embodiment defines a centrally located opening 36 for receiving and frictionally engaging an alignment member 38. The alignment member is generally a post that extends outwardly from the front face of the ferrule holder for engaging a corresponding opening defined by the ferrule holder of another connector assembly and for facilitating alignment and interconnection of the respective optical fibers. Instead of a centrally located opening, the ferrule holder of an alternative embodiment can include an outwardly extending alignment pin for engaging a corresponding opening defined by the ferrule holder of another connector assembly and for facilitating alignment and interconnection of the respective optical fibers. The outwardly extending alignment member or alignment pin can also include a longitudinal groove, rib or other alignment feature 38a for engaging a corresponding alignment feature within the centrally located opening(s) defined by the ferrule holder(s), thereby insuring that the connector assemblies are also angularly or rotationally aligned. However, the connector assembly 14 can include other means for aligning the ferrule holder and, in turn, the ferrules with the ferrule holder of another connector assembly without departing from the spirit and scope of the present invention. For example, the outer surface of the ferrule holder illustrated in FIG. 5 defines a lengthwise extending groove 39 for receiving one end of an alignment pin that serves to align the illustrated ferrule holder, such as with a ferrule holder disposed within the receptacle 54 of FIG. 1.

The connector assembly 14 can also include a plug 40 extending between opposed first and second ends. As shown in FIGS. 2 and 3, the first end 40a of the plug is connected to the head end 26b of the slack storage tube 26. For example, the first end of the plug can be sized to snugly fit within the head end of the slack storage tube. Thereafter, the slack storage tube can be crimped or otherwise attached to the first end of the plug. As also shown in FIGS. 2 and 3, the ferrule holder 30 is mounted at least partially within the second end 40b of the plug. Since the second end of the plug is sized to receive the ferrule holder, the second end of the plug generally defines a larger opening than the first end of the plug which need only be large enough to permit the optical fibers to pass therethrough. However, the plug can define an internal bore extending between the opposed first and second ends and having a uniform inner diameter without departing from the spirit and scope of the present invention.

The connector assembly 14 can also include a plurality of springs 42, one of which is associated with and engages the rear face of each ferrule 24. As such, the springs bias the ferrules outwardly toward the second end 40b of the plug 40. The connector assembly can also include a spring plate 44 disposed within the plug and rearward of the ferrule holder 30. As illustrated in FIGS. 2 and 3, the spring plate is preferably attached to the rear of the ferrule holder, such as by means of a bolt 46 having a head portion that is retained at least partially within the centrally located opening 36 and a shank portion which threadably engages a threaded aperture defined by the spring plate. According to one advantageous embodiment, the spring plate includes a number of radially extending arms. As shown, the optical fibers extend between the radial arms of the spring plate, while the springs press against one or more of the radial arms. Thus, the springs urge the plurality of ferrules outwardly toward the second end of the plug.

Once assembled, the ferrules 24, the ferrule holder 30 and the spring plate 44 are mounted within the opening defined by the second end 40b of the plug 40. For the illustrated embodiment, the ferrule holder is retained within the plug by means of a retaining ring 47 that is disposed within a corresponding circumferential groove defined by the inner surface of the plug. However, the ferrule holder can be held within the plug in a number of other manners, such as by means of set screws extending through the plug wall and engaging the ferrule holder.

As shown in FIG. 3, the slack storage tube 26 is at least partially flexible and, as a result, can be bent laterally to permit the connector assembly 14 to be turned and bent during installation of the fiber optic cable 12. In order to further facilitate the installation of a preconnectorized fiber optic cable, the slack storage tube is generally cylindrical. In this regard, it is contemplated that a generally cylindrical slack storage tube includes both cylindrical slack storage tubes, as shown in FIGS. 2–4, and corrugated slack storage tubes as shown in FIG. 6.

The slack storage tube 26 preferably includes crush resistance means to support the slack storage tube as the slack storage tube is bent or flexed, thereby keeping the longitudinal bore 26c of the slack storage tube open as the slack storage tube is bent. The crush resistance means can include any of a variety of means for increasing the crush resistance of the slack storage tube. As shown in FIGS. 2–4, for example, the slack storage tube can include a wire 26e that is wound about the slack storage tube. Preferably, the wire is wound about the slack storage tube in a helical fashion. While the wire can be attached, such as by glue or the like, to the outer and/or inner surfaces of the slack storage tube, the slack storage tube of one advantageous embodiment includes a wire embedded within the tube as best shown in cross-section in FIG. 3. In order to provide crush resistance, the wire is formed of a material which is stiffer than the material forming the remainder of the slack storage tube. For example, the wire can be formed of a metal, such as stainless steel, while the remainder of the slack storage tube is formed of rubber, a plastic, such as polyvinyl chloride (PVC), or a TEFLON® material.

Alternatively, the slack storage tube 26 can be a corrugated metal tube as shown in FIG. 6. In this embodiment, the slack storage tube is formed entirely of the same material, such as a metal. However, the slack storage tube of this alternative embodiment includes crush resistance means as a result of the corrugated structure of the slack storage tube.

The connector assembly 14 can also include a mesh sleeve 48, typically formed of nylon or stainless steel, that surrounds the slack storage tube 26. The mesh sleeve extends between opposed first and second ends and is generally slightly longer than the slack storage tube. As shown in FIGS. 2 and 3, the mesh sleeve is also connected to the first end of the fiber optic cable 12. While the mesh sleeve can be connected to the first end of the fiber optic cable in a variety of manners, the connector assembly of the illustrated embodiment includes a second shrink tube 50 or crimp band placed about the first end of the fiber optic cable and the first end of the mesh sleeve. By heating the second shrink tube, the second shrink tube contracts about the first end of the fiber optic cable and the first end of the mesh sleeve, thereby securely connecting the fiber optic cable and the mesh sleeve. In addition, the second end of the mesh sleeve is operably attached to the ferrules 24. For example, the second end of the mesh sleeve of the illustrated embodiment is connected to the plug 40 which, in turn, receives the ferrule holder 30 in which each of the ferrules is mounted. While the second end of the mesh sleeve can be connected to the plug in a variety of manners, the connector assembly of the illustrated embodiment includes a crimp band 52, typically formed of a metal, that is slipped over and surrounds the second end of the mesh sleeve, the head end 26b of the slack storage tube 26 and the first end 40a of the plug. By compressing the crimp band in a radially inward direction, the second end the mesh sleeve and the head end of the slack storage tube are securely connected to the first end of the plug.

Once assembled, the end portions of the optical fibers of the fiber optic cable 12 extend through the lengthwise extending bore 26c of the slack storage tube 26. According to the present invention, the slack storage tube has a length which is less than the predetermined distance by which the optical fibers extend beyond the protective jacket 22 of the fiber optic cable. As such, the excess or slack optical fiber is stored or maintained within the slack storage tube. Preferably, however, the optical fibers within the slack storage tube are only slightly longer than the slack storage tube such that the optical fibers assume a generally helical configuration in which the slack in the optical fibers is taken up by a number of relatively gentle bends, thereby avoiding the formation of loops in the slack optical fiber within the slack storage tube. As a result, the cross-sectional dimensions of the slack storage tube and, in turn, the connector assembly 14 can be reduced to a size approximating the fiber optic cable 12 since the optical fibers need not be looped within the slack storage tube. Therefore, the connector assembly of the present invention facilitates the installation of a fiber optic cable in relatively confined spaces. In addition, since slack lengths of the optical fibers are stored within the slack storage tube, the connector assembly can be readily flexed or bent without imparting deleterious tensile or elongation forces upon the optical fibers, thereby further facilitating the installation of a fiber optic cable along a sinuous cable path having one or more sharp turns or bends.

By way of example, a slack storage tube of one advantageous embodiment is about three feet in length and contains approximately two inches of slack in the optical fibers. As such, the optical fibers are bent only gently within the slack storage tube. In addition, the ratio of the outer diameter of the slack storage tube to the outer diameter of the fiber optic cable is preferably between about 1.2:1 and 1.5:1 according to one advantageous embodiment. It should be apparent to those skilled in the art, however, that the slack storage tube can be of a different length, can store a different amount of slack in the optical fibers and can have a different outer diameter without departing from the spirit and scope of the present invention.

In order to mount the connector assembly 14 of the present invention upon the end portion of a fiber optic cable 12, the protective jacket 22 of the fiber optic cable is initially stripped from the end portion of the fiber optic cable such that the optical fibers extend beyond the protective jacket by a predetermined distance. This predetermined distance is determined not only by the amount of slack which is desirably stored within the slack storage tube 26 of the connector assembly, but also by the physical layout of the production equipment, such as the polishing machines. As described above, the physical layout of the production equipment may demand that the ferrules 24 be separated by a set distance in order to appropriately polish or otherwise process the ferrules once the ferrules have been mounted upon end portions of the respective optical fibers. For example, the optical fibers can extend beyond the protective jacket by 10 to 20 inches or more if a large separation between ferrules is required by the physical layout of the production equipment.

In stripping the protective jacket 22, the end portion of the lengthwise extending strength member 20 is also removed such that the strength member extends only a short distance beyond the protective jacket of the fiber optic cable 12. In a like fashion, the end portion of the buffer tube 16 is also removed such that the buffer tube only extends a short distance beyond the protective jacket of the fiber optic cable.

Once the fiber optic cable 12 has been appropriately terminated, the ferrules 24 are mounted upon the end portions of the optical fibers. As described above, the ferrules can be multi-fiber ferrules, such as MT ferrules, which are mounted upon the end portions of respective ribbons 18 of optical fibers. Alternatively, the ferrules can be single fiber ferrules for mounting upon the end portions of respective single optical fibers. Once the ferrules have been mounted upon the end portions of the respective optical fibers, the end portions of the ferrules can be individually machined or polished. The individual processing of each ferrule is therefore facilitated since the connector assembly 14 of the present invention permits the end portions of the optical fibers and, in turn, the ferrules mounted upon the end portions of the optical fibers to be widely separated.

Thereafter, the slack storage tube 26 is slid over the optical fibers and is mounted to the first end of the fiber optic cable 12, such as by means of a shrink tube 28 as described above. In order to further secure the slack storage tube to the first end of the fiber optic cable, epoxy can be introduced through the epoxy fill ports 26d defined by the slack storage tube. Once the epoxy cures or hardens about the strength members 20 extending beyond the protective jacket 22 of the fiber optic cable and into the rear end 26a of the slack storage tube, the slack storage tube is firmly mounted to the first end of the fiber optic cable and water migration along the fiber optic cable is prevented or blocked from entering the connector assembly 14 of the present invention.

The mesh sleeve 48 may then be slipped over the slack storage tube 26 and connected, at a first end, to the first end of the fiber optic cable 12, such as by means of a second shrink tube 50 as described above. The plug 40 can then be attached to the head end 26b of the slack storage tube and the second end of the mesh sleeve, such as by means of a crimp band 52 which encircles the second end of the mesh sleeve, the head end of the slack storage tube and the first end of the plug. Once the ferrules 24 have been mounted within an appropriate ferrule holder 30, springs 42 are loaded into the rear end of the ferrule holder so as to operably contact respective ones of the ferrules. The ferrule holder is then connected to the spring plate 44 so as to secure the ferrules and springs therein. The ferrule holder can then be mounted within the opening defined by the second end 40b of the plug, such as by means of a retaining ring 47 that is snap-fit within corresponding groove defined within the plug. As described above, the ferrule holder can include an alignment member 38 or alignment pin for facilitating interconnection of the connector assembly 14 of the present invention with another connector assembly or the like. The alignment member of the ferrule holder also provides for the alignment of the optical fibers such that optical signals may be readily transmitted and received following interconnection of the connector assembly of the present invention.

As shown in FIG. 1, for example, the connector assembly 14 can be connected to a corresponding receptacle 54. While the connector assembly of the illustrated embodiment is designed to threadably engage the receptacle, the connector assembly can be connected to the receptacle in a variety of other manners, such as by a push-pull arrangement or by means of more complex mechanical linkages known to those skilled in the art. Although not illustrated, the receptacle can be mounted upon a panel, such as a telephone patch panel or other closure, such that the optical fibers terminated by the connector assembly of the present invention can be connected with corresponding optical fibers within the panel or closure. In this regard, several advantageous receptacles which could readily mate with the connector assembly of the present invention are described in detail in U.S. patent application Ser. No. 08/870,667, entitled "Receptacle Having A Rotatable Coupling Nut For Engaging A Fiber Optic Connector Assembly", filed concurrently herewith and assigned to the assignee of the present invention, the contents of which are incorporated by reference herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An at least partially flexible connector assembly for mounting upon a first end of a fiber optic cable that includes at least one optical fiber, the at least partially flexible connector assembly comprising:

at least one ferrule mounted on end portions of the at least one optical fiber of the fiber optic cable;

a ferrule holder for engaging said at least one ferrule and for maintaining said at least one ferrule in a predetermined position relative thereto; and a slack storage tube extending between a rear end and an opposed head end and defining a lengthwise extending bore, said slack storage tube being at least partially resiliently flexible, wherein the rear end of said slack storage tube is capable of mounting upon the first end of the fiber optic cable and said ferrule holder is operably attached to the head end of said slack storage tube such that the at least one optical fiber of the fiber optic cable extends through the bore defined by said slack storage tube and slack in the at least one optical fiber is maintained within said slack storage tube.

2. A connector assembly according to claim 1 wherein said slack storage tube having crush resistance means for supporting said slack storage tube as the connector assembly is flexed.

3. A connector assembly according to claim 2 wherein said crush resistance means comprises a wire helically wound about said slack storage tube.

4. A connector assembly according to claim 2 wherein said slack storage tube comprises a corrugated tube.

5. A connector assembly according to claim 1 further comprising a mesh sleeve surrounding said slack storage tube and extending between opposed first and second ends, wherein the first end of said mesh sleeve is capable of being mounted to the first end of the fiber optic cable, and wherein the second end of said mesh sleeve is operably attached to the ferrule holder to thereby strengthen the connector assembly.

6. A connector assembly according to claim 1 wherein said slack storage tube defines at least one epoxy fill port for introducing epoxy into the lengthwise extending bore of said slack storage tube.

7. A connector assembly according to claim 1 further comprising a plug extending between opposed first and second ends, wherein the first end of said plug is connected to the head end of said slack storage tube, and wherein said ferrule holder is mounted at least partially within the second end of said plug.

8. A fiber optic cable assembly comprising:
   a fiber optic cable comprising a protective jacket and at least one optical fiber extending by a predetermined distance beyond the protective jacket at a first end of said fiber optic cable; and
   an at least partially flexible connector assembly mounted on the first end of said fiber optic cable, said connector assembly comprising:
      at least one ferrule mounted on end portions of said at least one optical fiber; and
      a slack storage tube extending between a rear end and an opposed head end and defining a lengthwise extending bore, said slack storage tube being at least partially flexible,
   wherein the rear end of said slack storage tube is connected to the first end of said fiber optic cable and said at least one ferrule is operably attached to the head end of said slack storage tube such that said at least one optical fiber extends through the bore defined by said slack storage tube,
   and wherein said slack storage tube has a length less than the predetermined distance that said at least one optical fiber extends beyond said protective jacket such that slack in said at least one optical fiber is maintained within said slack storage tube.

9. A fiber optic cable assembly according to claim 8 wherein slack in said at least one optical fiber is maintained within said slack storage tube without creating loops in said at least one optical fiber.

10. A fiber optic cable assembly according to claim 8 wherein said slack storage tube comprises crush resistance means for supporting said slack storage tube as said connector assembly is flexed.

11. A fiber optic cable assembly according to claim 10 wherein said crush resistance means comprises a wire helically wound about said slack storage tube.

12. A fiber optic cable assembly according to claim 10 wherein said slack storage tube comprises a corrugated tube.

13. A fiber optic cable assembly according to claim 8 wherein said connector assembly further comprises a mesh sleeve surrounding said slack storage tube and extending between opposed first and second ends, wherein the first end of said mesh sleeve is connected to the first end of said fiber optic cable, and wherein the second end of said mesh sleeve is operably attached to said at least one ferrule to thereby strengthen said connector assembly.

14. A fiber optic cable assembly according to claim 8 wherein said fiber optic cable further comprises a lengthwise extending strength member that extends beyond the protective jacket and into the lengthwise extending bore of said slack storage tube, and wherein said slack storage tube defines at least one epoxy fill port for introducing epoxy into the lengthwise extending bore of said slack storage tube such that the lengthwise extending strength member of said fiber optic cable is secured therein.

15. A fiber optic cable assembly according to claim 7 wherein said connector assembly further comprises a ferrule holder, operably connected to the head end of said slack storage tube, for engaging said at least one ferrule and for maintaining said at least one ferrule in a predetermined position relative thereto.

16. A fiber optic assembly according to claim 15 wherein said connector assembly further comprises a plug extending between opposed first and second ends, wherein the first end of said plug is connected to the head end of said slack storage tube, and wherein said ferrule holder is mounted at least partially within the second end of said plug.

17. A connector assembly for mounting upon a first end of a fiber optic cable that includes at least one optical fiber, the connector assembly comprising:
   at least one ferrule mounted on end portions of the at least one optical fiber of the fiber optic cable;
   a ferrule holder for engaging said at least one ferrule and for maintaining said at least one ferrule in a predetermined position relative thereto; and
   a slack storage tube extending between a rear end and an opposed head end and defining a lengthwise extending bore, wherein said corrugated slack storage tube comprises crush resistance means for supporting said slack storage tube as the connector assembly is flexed such that the longitudinal bore defined by said slack storage tube remains open,
   and wherein the rear end of said slack storage tube is capable of mounting upon the first end of the fiber optic cable and said ferrule holder is operably attached to the head end of said slack storage tube such that the at least one optical fiber of the fiber optic cable extends through the bore defined by said slack storage tube and slack in the at least one optical fiber is maintained within said slack storage tube.

18. A connector assembly according to claim 17 wherein said slack storage tube is at least partially flexible, and wherein said crush resistance means comprises a wire helically wound about said slack storage tube.

19. A connector assembly according to claim 17 wherein said slack storage tube comprises an at least partially flexible, corrugated tube.

20. A connector assembly according to claim 17 further comprising a mesh sleeve surrounding said slack storage tube and extending between opposed first and second ends, wherein the first end of said mesh sleeve is capable of being mounted to the first end of the fiber optic cable, and wherein the second end of said mesh sleeve is operably attached to the ferrule holder to thereby strengthen the connector assembly.

21. A connector assembly according to claim 17 wherein said slack storage tube defines at least one epoxy fill port for introducing epoxy into the lengthwise extending bore of said slack storage tube.

22. A connector assembly according to claim 17 further comprising a plug extending between opposed first and second ends, wherein the first end of said plug is connected to the head end of said slack storage tube, and wherein said ferrule holder is mounted at least partially within the second end of said plug.

* * * * *